Feb. 21, 1956   J. O. CHARSHAFIAN   2,735,263
COMBINATION ROCKET AND RAM-JET POWER PLANT
Filed Dec. 6, 1947   2 Sheets-Sheet 1
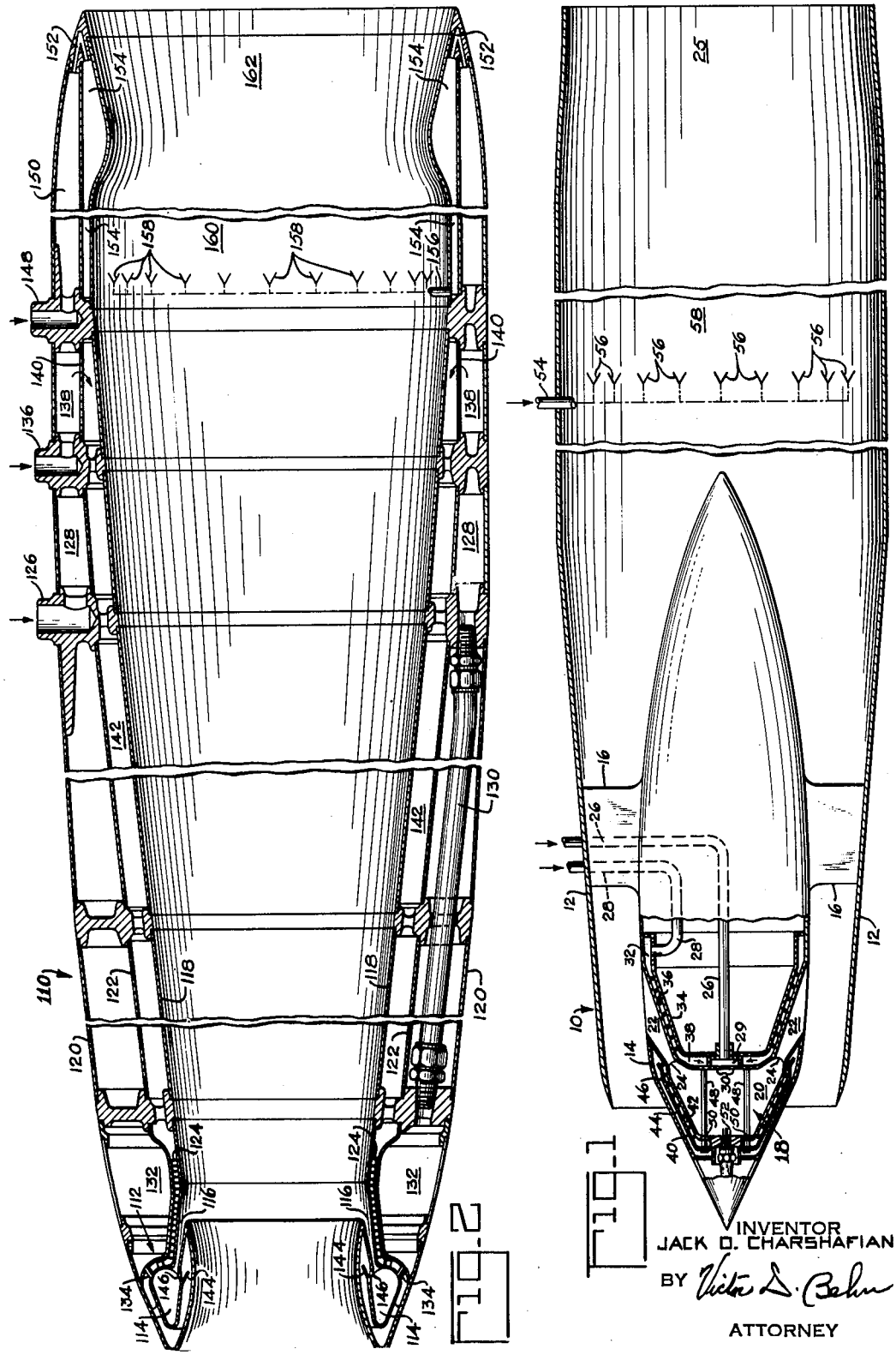
INVENTOR
JACK O. CHARSHAFIAN.
BY
ATTORNEY Feb. 21, 1956    J. O. CHARSHAFIAN    2,735,263
COMBINATION ROCKET AND RAM-JET POWER PLANT
Filed Dec. 6, 1947    2 Sheets-Sheet 2

INVENTOR.
JACK O. CHARSHAFIAN
BY Victor A. Behn
ATTORNEY

United States Patent Office 2,735,263
Patented Feb. 21, 1956

2,735,263

COMBINATION ROCKET AND RAM-JET POWER PLANT

Jack O. Charshafian, Englewood, N. J., assignor to Curtiss-Wright Corporation, a corporation of Delaware Application December 6, 1947, Serial No. 790,195

4 Claims. (Cl. 60—35.6)

This invention relates to jet engines and is particularly directed to a combination rocket and ram jet engine.

In a ram jet engine, air enters a duct at its forward end as a result of forward motion of said duct. In addition, fuel is added to said air and burned in said ram jet duct, the products of combustion discharging rearwardly from the duct to provide the ram jet engine with forward thrust. Therefore, under static or low air speed operation of a ram jet engine, only a small amount of air is available for combustion so that, under such low air speed operation, no appreciable thrust is provided by this type of jet engine. In a rocket jet engine, all the elements required for combustion are carried with the rocket, and the exhaust gases discharge rearwardly therefrom to provide the engine with forward thrust.

A rocket engine provides substantial thrust at low air speeds, but, with an exhaust jet of a given mass flow, the ability to utilize the energy of the jet varies as the ratio of the engine air speed to the velocity of its exhaust jet. Accordingly if the exhaust jet of a rocket were converted to one of larger mass flow and lower velocity, the thrust produced by the rocket, particularly at low air speeds, would be considerably increased. This has been accomplished by using a rocket with an open-ended duct surrounding said rocket in such a manner that said rocket exhaust acts as an ejector to induce air flow through said duct. As a result, the rocket exhaust jet mixes with said induced air to provide a jet having a larger mass flow and a smaller velocity than the original exhaust jet of the rocket, thereby increasing the thrust produced. A duct so disposed about a rocket is known as an augmenter duct. The engine thrust may be further increased by modifying said augmenter duct to comprise a ram jet.

The combination of a rocket and an augmenter duct, with or without said duct comprising a ram jet, has been proposed prior to the present invention. It is an object of this invention to provide a new and improved combination rocket and augmenter duct or ram jet duct. In a conventional rocket, the products of combustion discharge rearwardly in a concentrated jet through a circular discharge orifice at the rear of the rocket. In accordance with the present invention the rocket is provided with an annular discharge conduit co-axial with the augmenter duct or ram jet duct. With this construction the contact area between the rocket exhaust jet and the air in the surrounding duct is greatly increased, as compared to a rocket having a circular discharge orifice, thereby increasing the ejector action of the rocket exhaust jet.

Other objects of the invention will become apparent upon reading the annexed detailed description in connection with the drawing in which:

Figure 1 is a diagrammatic sectional view through a jet engine embodying the invention;

Figure 2 is a diagramamtic sectional view of a modified form of the invention.

Figure 3:
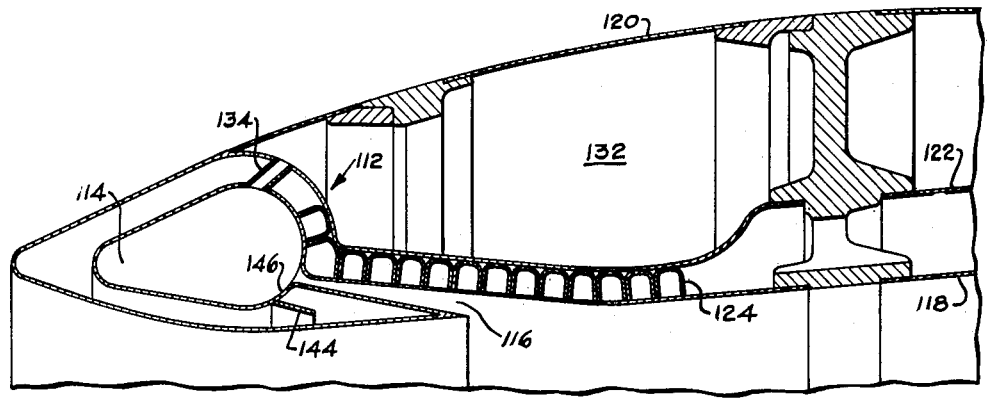
Figures 3 and 4 are enlarged views of portions of Figures 1 and 2 respectively.
Figure 4:
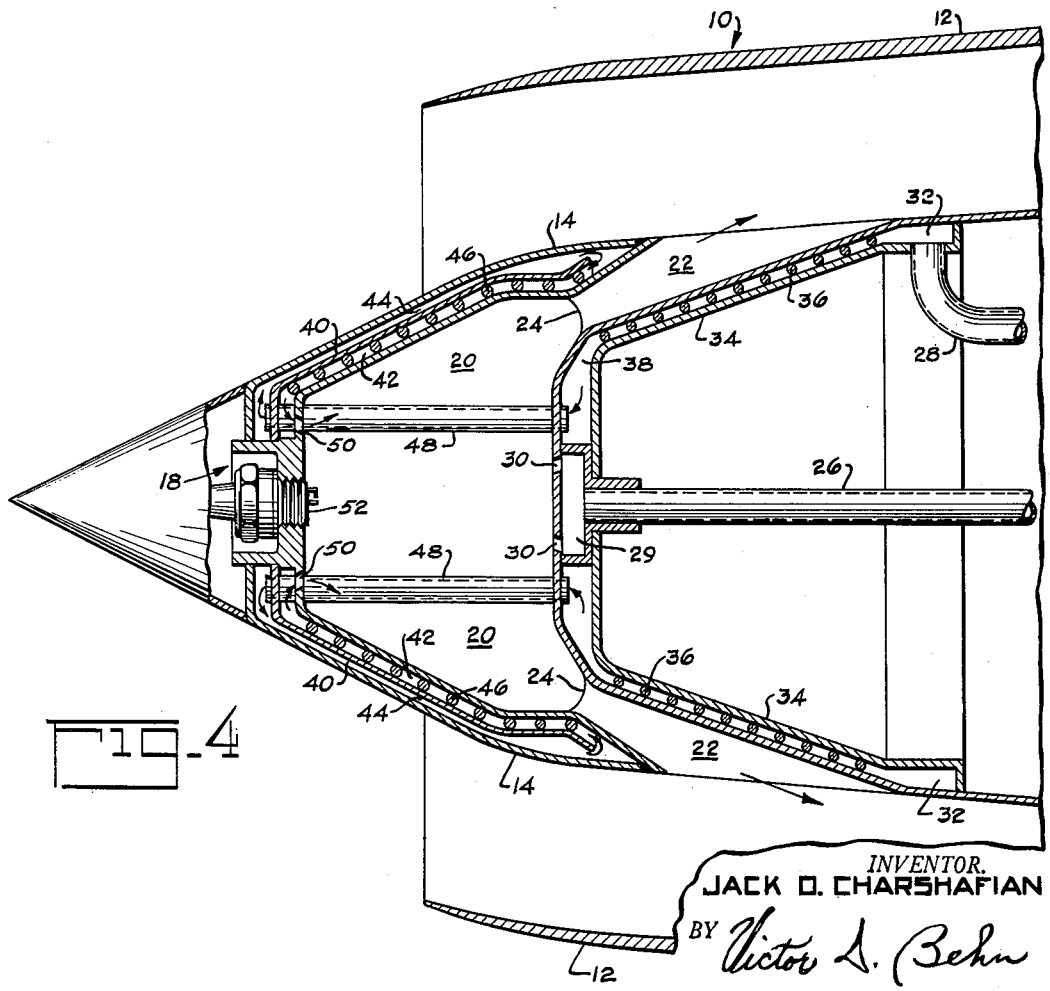

Referring to Figure 1 of the drawing, a jet engine 10 comprises an open-ended duct 12 having a center body or housing 14 co-axially supported therein adjacent the forward end of said duct 12 by supporting webs 16 extending radially between said duct 12 and housing 14. A rocket 18 is disposed in the housing 14 adjacent the forward end thereof. Preferably the contour of the housing 14 is such that said housing acts as a diffuser for reducing the velocity of the air entering the duct 12, through the annular passage between the housing 14 and duct 12, thereby converting at least a portion of the velocity head of the entering air into pressure head.

The rocket 18 comprises a wall structure forming a combustion chamber 20 and an annular outwardly flaring conical nozzle or discharge conduit 22, suitable supporting vanes or webs 24 being provided across said conduit. The annular conduit 22 is co-axial with the duct 12 and flares outwardly in a downstream direction to provide a hollow conical exhaust jet co-axial with the duct 12 and discharging into the annular passage between the housing 14 and the duct 12 adjacent the forward end of said duct. With this construction the exhaust jet of the rocket 18 acts as an ejector inducing air flow through the duct 12 so that the resulting mixture of air and rocket exhaust has a much larger mass flow and a much smaller velocity as compared to the rocket exhaust in the conduit 22. The resulting mixture of the rocket exhaust jet and the air flow induced into the duct 12, discharges rearwardly therefrom through a nozzle or discharge opening 25.

The elements necessary for supporting combustion in the rocket combustion chamber 18—for example, liquid oxygen and a suitable fuel—are supplied thereto through conduits 26 and 28 which may pass through one or more of the rocket supporting webs 16. One of the elements of combustion, such as liquid oxygen, is supplied through the conduit 26 to a chamber 29 at the rear end of the rocket and from this chamber said oxygen discharges into the rocket combustion chamber 20 through orifices 30.

Another element of combustion, such as a suitable fuel, is supplied through the conduit 28 to an annular space 32 formed adjacent the inner wall of the annular discharge conduit 22 of the rocket by a jacket 34. The annular space 32 is divided into a helical flow path, for said fuel, by a helically coiled member 36 disposed in said space between the inner wall of said annular conduit 22 and its jacket 34. With this arrangement fuel flows in a helical flow path along the inner wall of the annular conduit 22 toward the combustion chamber end of said conduit to a chamber 38 at the rear of the rocket.

A jacket member 40 is also disposed about the forward and outer wall of the rocket combustion chamber and about the outer wall of its annular discharge conduit 22 thereby forming a first annular space 42 between said jacket member 40 and the rocket and a second annular space 44 between said jacket member 40 and the adjacent wall of the housing 14. The annular spaces 42 and 44 are in communication with each other adjacent the downstream end of the annular discharge conduit 22. In addition the annular space 42 is divided into a helical path by a helically coiled member 46 disposed therein.

Through passages, such as 48, fuel flows from the chamber 38, at the rear of the rocket 18, to the forward end of the rocket into the annular space 44 and thence said fuel flows into the annular space 42 at the downstream end of the outer wall of the annular conduit 22. Fuel flows along and around this outer wall and the outer and forward wall of the combustion chamber 20 in a helical path to the forward end of the rocket and then said fuel discharges into the rocket combustion chamber 20 through orifices 50. If necessary, suitable ignition means—as for example an electric spark gap 52—is provided for igniting the combustion mixture within the chamber 20.

With the aforedescribed construction, fuel flows in a helical path along and in heat exchange relation with the inner wall of the annular conduit 22 thereby cooling said wall to prevent its temperature from becoming excessive. Said fuel then flows to the downstream end of the outer annular wall of the conduit 22 and thence in a helical path along this outer wall as well as along the outer and forward wall of the rocket combustion chamber. Accordingly the fuel flowing along the outer wall of the annular discharge conduit 22 of the rocket is first heated by its flow along the inner wall of said conduit whereby said outer wall is cooled less by said fuel than said inner wall. However, the outer wall of the annular discharge conduit 22 of the rocket is disposed in better heat exchange relation with the relatively cool air entering the duct 12 than the inner wall of said conduit.

With the structure so far described, the duct 12 comprises a so-called augmenter duct which is effective to substantially increase the thrust produced by the rocket 18. In addition to this function, the duct 12 may also comprise the duct of a ram jet engine. For this purpose, fuel is introduced into the duct 12 through a conduit 54 and fuel burner structure, schematically indicated at 56, for combustion with the air entering said duct. This latter fuel may be similar to that supplied through the conduit 28 to the rocket 18. Suitable ignition means (not shown) are provided for igniting the combustion mixture in the ram jet combustion chamber 58, said ignition means may be similar to the electric spark gap 52 provided for the rocket combustion chamber. The products of combustion of the ram jet together with the rocket exhaust discharge rearwardly out through the nozzle or discharge opening 25 at the rear end of the duct 12. With the conduit 12 comprising a ram jet engine, it not only acts as an augmenter duct for the rocket 18, but the air flow induced through said duct by the rocket exhaust jet provides air for the ram jet combustion chamber 58 for combustion therein. This function is particularly important at low air speeds of the ram jet engine since, in the absence of the air flow induced in the duct 12 by the ejector action of the rocket exhaust, the only air entering the duct 12 is that resulting from forward motion of said duct through the surrounding air. Accordingly, and particularly at low air speeds, the thrust produced by the ram jet itself is also increased by the air flow induced through the duct 12 by the ejector action of the rocket exhaust.

Instead of disposing the rocket within a center body or housing symmetrically disposed at the forward end of the ram jet or augmenter duct as in Figure 1, said duct may be provided with a hollow wall structure with the rocket disposed therein. This latter arrangement is illustrated in Figure 2. In Figure 2, a jet engine comprises a duct 110 having a hollow wall structure with an annular rocket 112 disposed therein co-axially about the axis of said duct and adjacent the forward end thereof. The rocket 112 comprises an annular combustion chamber 114 with an annular discharge conduit or nozzle 116 opening into the duct 110. The annular conduit 116 is conical and converges radially inwardly toward the axis of the duct 110 whereby the rocket exhaust discharges into the duct 110 in a hollow conical jet. As in Figure 1, the ejector action of the exhaust of the rocket 112 induces air flow through the duct 110.

The hollow annular wall structure of the duct 110 comprises an inner wall 118, an outer wall 120, and an intermediate wall 122. The forward end of said intermediate wall 122 forms a jacket about the outer wall of the annular discharge conduit 116 of the rocket 112 and about the rear portion of the rocket combustion chamber 114. A member 124 of channel shaped cross-section is disposed between said jacket portion of the intermediate wall 122 and the adjacent structure of the rocket to form a helical flow path therealong.

One of the elements of combustion, such as liquid oxygen, is supplied to the rocket 112 through a conduit 126 from which it flows into an annular chamber 128 and thence sequentially through a conduit 130, annular chamber 132, and passages 134 into the rocket combustion chamber 114. A suitable fuel, comprising the other element of combustion of the rocket, is supplied through a conduit 136 into an annular chamber 138 and thence through holes 140 into the annular space 142 between the inner wall 118 and the intermediate wall 122 of the hollow wall structure of the duct 110. At the forward end of this annular space 142 the fuel flows along the helical path, provided by the member 124, about the outer wall of the annular rocket nozzle 116 and about the rear wall of the rocket combustion chamber. From this helical path said fuel flows into and fills the space between the rocket combustion chamber and the adjacent forward ends of the inner and outer walls 118 and 120 of the hollow structure of the duct 110, and in addition said fuel flows into the annular space between the annular inner wall of the rocket nozzle 116 and the inner wall of the hollow structure of the duct 110. An annular baffle member 144 is provided to insure flow of said fuel over the inner annular wall of the rocket nozzle 116, said fuel discharging therefrom into the rocket combustion chamber 114 through orifices 146.

The inner wall of the annular rocket discharge conduit 116 is cooled by fuel which has already been heated by its flow in heat exchange relation with the annular outer wall of said conduit. However, said inner wall is disposed in better heat exchange relation with the relatively cool air entering the duct 110. Accordingly in Figure 2, as in Figure 1, the wall of the annular rocket discharge conduit, which is disposed in better heat exchange relation with the relatively cool air entering the duct 110, than the other wall of said conduit, is cooled by fuel which has previously been heated by its flow in heat exchange relation with said other wall. This construction provides for substantially similar cooling of both annular walls of the rocket discharge nozzle or conduit.

As in Figure 1, the duct 110 may comprise a ram jet duct. For this purpose, fuel is supplied thereto through a conduit 148. From the conduit 148, said fuel enters an annulus 150 formed between the rear portions of the wall 120 and the intermediate wall 122 of the hollow structure of the duct 110. Fuel flows rearwardly along the annulus 150 and thence through passages 152 to an annulus 154 formed between the inner wall 118 and the intermediate wall 122 of the hollow structure of the duct 110. From the annulus 154, fuel flows into one or more conduits 156 communicating with fuel burner structure, schematically indicated at 158, through which fuel discharges into the ram jet combustion chamber 160 for combustion therein. Suitable ignition means are provided for igniting the fuel-air mixture in the ram jet combustion chamber 160. The resulting products of combustion together with the rocket exhaust discharges rearwardly out through the discharge opening or nozzle 162 at the rear of the duct 110. The fuel supplied to the ram jet combustion chamber 160 may be similar to the fuel supplied to the rocket combustion chamber 114.

The flow of fuel along the annular passage 154 helps to cool the walls of the rocket combustion chamber 160. Obviously the jet engine of Figure 1 may be modified to incorporate this feature.

The operation of the jet engine of Figure 2 is similar to that of Figure 1. In both modifications, the rocket has an annular conical nozzle or discharge conduit through which the rocket exhaust discharges in a hollow conical jet co-axially into an open-ended duct. The arrangement is such that said jet acts as an ejector to induce air flow through said duct. As a result of this ejector action of the rocket exhaust in inducing air flow through said duct, a larger thrust is obtained than would otherwise be obtained from the rocket alone. In addition, when said duct is used as a ram jet, the ejector action of the rocket exhaust in inducing air flow through the duct, helps to supply air to the ram jet combustion chamber for combustion of the ram jet fuel thereby increasing the thrust obtained from the ram jet. In both modifications, because of the hollow conical form of the rocket exhaust jet, there is a relatively large contact area between said rocket exhaust jet and the air flow induced through the duct into which said jet discharges whereby the ejector action of the rocket exhaust is highly effective in inducing said air flow.

While I have described my invention in detail in its present preferred embodiments, it will be obvious to those skilled in the art, after understanding my invention, that various changes and modifications may be made therein without departing from the spirit or scope thereof. I aim in the appended claims to cover all such modifications.

I claim as my invention:

1. A jet engine comprising an open-ended duct-like member; a rocket carried by said duct-like member; said rocket having a combustion chamber and having an annular conical discharge conduit adapted to discharge rocket combustion gases co-axially into said duct-like member in a hollow conical jet so as to induce air flow through said duct-like member; and means providing a fuel passage about each wall of said annular discharge conduit such that the fuel supplied to said combustion chamber first flows along that annular wall of said discharge conduit most remote from the air flow path through said duct-like member and then said fuel flows along the other annular wall of said discharge conduit before it discharges into said combustion chamber.

2. A combined rocket and ram jet power plant comprising an open-ended duct-like member having a nozzle at its rear end; a housing symmetrically disposed within said duct-like member adjacent to the forward end thereof so as to form an annular passage between said housing and the interior wall of said duct-like member; a rocket disposed within said housing and having a combustion chamber and an annular discharge nozzle the discharge end of which opens into said annular passage, said annular rocket nozzle being conical and directed outwardly and rearwardly into said annular passage intermediate the ends of said annular passage for discharging the rocket exhaust gases therein in a hollow conical jet so as to induce air flow through said duct-like member and to discharge through the nozzle of said duct-like member to provide said power plant with forward propulsive thrust; and means for introducing fuel into said duct-like member exteriorly of said housing for combustion in said member to provide a ram jet engine the gases of which also discharge through the nozzle of said duct-like member to provide said power plant with forward propulsive thrust.

3. A jet engine comprising an open-ended duct-like member; a housing symmetrically disposed within said duct-like member adjacent the forward end thereof so as to form an annular passage between said housing and the interior wall of said duct-like member; a rocket disposed within said housing; said rocket having a combustion chamber and having an annular conical discharge conduit adapted to discharge rocket exhaust gases co-axially into said annular passage in a hollow conical jet so as to induce air flow through said duct-like member; and means providing a fuel passage about each wall of said annular discharge conduit such that the fuel supplied to said combustion chamber first flows along the radially inner wall of said annular conduit and then flows along the radially outer wall of said annular conduit before it discharges into said combustion chamber.

4. A jet engine comprising an open-ended duct-like member having a hollow wall structure; an annular rocket disposed in said wall structure adjacent the forward end of said duct-like member and co-axial therewith; said rocket having a combustion chamber and having an annular conical discharge conduit adapted to discharge the rocket exhaust inwardly and co-axially into said duct-like member in a hollow conical jet so as to induce air flow through said duct-like member; and means providing a fuel passage about each wall of said annular discharge conduit such that the fuel supplied to said combustion chamber first flows along the radially outer wall of said conduit and then flows along the radially inner wall of said annular conduit before it discharges into said combustion chamber.

References Cited in the file of this patent

UNITED STATES PATENTS

| | | |
|---|---|---|
| 1,305,340 | Bostedo | June 3, 1919 |
| 1,375,601 | Morize | Apr. 19, 1921 |
| 2,419,866 | Wilson | Apr. 29, 1947 |
| 2,491,610 | Goddard | Dec. 20, 1949 |
| 2,547,936 | Grow | Apr. 10, 1951 |

FOREIGN PATENTS

| | | |
|---|---|---|
| 309,273 | Italy | July 1, 1933 |
| 799,258 | France | Mar. 27, 1936 |
| 857,780 | France | Apr. 26, 1940 |